United States Patent
Bugnon et al.

(10) Patent No.: US 6,913,640 B2
(45) Date of Patent: Jul. 5, 2005

(54) SINGLE-PHASE MIXED CRYSTALS OF LAKED MONOAZO DYES

(75) Inventors: Philippe Bugnon, Essert (CH); Carolin Sansonnens, Cugy (CH); Greig Chisholm, Glasgow (GB)

(73) Assignee: CIBA Specialty Chemicals, Tarrytown, NY (US)

( * ) Notice: Subject to any disclaimer, the term of this patent is extended or adjusted under 35 U.S.C. 154(b) by 0 days.

(21) Appl. No.: 10/466,724

(22) PCT Filed: Jan. 15, 2002

(86) PCT No.: PCT/EP02/00339

§ 371 (c)(1),
(2), (4) Date: Dec. 23, 2003

(87) PCT Pub. No.: WO02/059217

PCT Pub. Date: Aug. 1, 2002

(65) Prior Publication Data

US 2004/0087781 A1 May 6, 2004

(30) Foreign Application Priority Data

Jan. 24, 2001 (CH) ................................................ 0119/01

(51) Int. Cl.[7] .......................... C09B 67/22; C09B 63/00; C09B 67/48
(52) U.S. Cl. ..................... 106/402; 106/31.78; 106/496; 106/498; 349/106; 430/7; 430/108.23; 524/94; 534/581; 534/602; 534/724; 534/784
(58) Field of Search .............................. 106/31.78, 402, 106/496, 498; 349/106; 430/7, 108.23; 524/94; 534/581, 602, 724, 784

(56) References Cited

U.S. PATENT DOCUMENTS

| | | | |
|---|---|---|---|
| 4,594,411 A | 6/1986 | Henning | 534/784 |
| 4,980,458 A * | 12/1990 | Hari et al. | 534/575 |
| 4,992,495 A | 2/1991 | Hari et al. | 524/106 |
| 5,047,517 A | 9/1991 | Deucker | 534/784 |
| 5,457,188 A | 10/1995 | Zimmermann | 534/780 |
| 6,235,100 B1 | 5/2001 | Hays | 106/31.78 |

FOREIGN PATENT DOCUMENTS

| | | |
|---|---|---|
| DE | 2616981 | 10/1977 |
| EP | 0073972 | 3/1983 |
| EP | 0126405 | 11/1984 |
| EP | 0225553 | 6/1987 |
| EP | 0263074 | 4/1988 |
| EP | 0361431 | 4/1990 |
| EP | 0553965 | 8/1993 |
| WO | 00/78872 | 12/2000 |

* cited by examiner

Primary Examiner—Anthony J. Green
(74) Attorney, Agent, or Firm—Tyler A. Stevenson

(57) ABSTRACT

Novel improved single-phase mixed crystals of monoazo dyes laked with alkaline earth metal cations and ammonium cations in a molar ratio of about 1:2 having a fine particle size and substantially better fastness properties than similar known products are excellently suitable as tinctorially strong pigments. Also claimed is a process for the preparation of a single-phase mixed crystal pigment of formula (II)

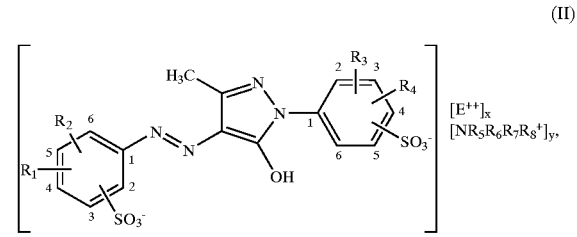

wherein E is Mg, Ca or Sr, by crystallisation from an inert hydrophilic liquid in the presence of solvated catiens $E^{++}$, $NR_5R_6R_7R_8^+$, x is a number from 0.33 to 0.62 and y is a number from 0.76 to 1.34, and the concentration of solvated catiens $E^{++}$ at the beginning of the crystallisation is higher than the concentration of solvated cations $NR_5R_8R_7R_8^+$.

21 Claims, 1 Drawing Sheet

SINGLE-PHASE MIXED CRYSTALS OF LAKED MONOAZO DYES

The invention relates to novel improved mixed crystals of monoazo dyes of formula:

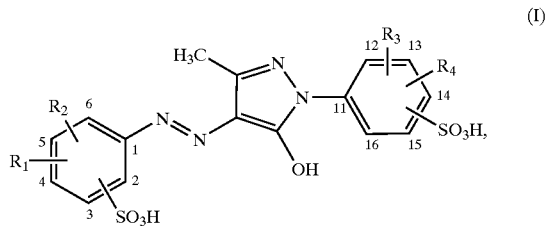

(I)

wherein $R_1$ is methyl or chlorine, and $R_2$, $R_3$ and $R_4$ are each independently of the others hydrogen, methyl or chlorine, which dyes have been laked with alkaline earth metal cations and ammonium cations in a molar ratio of about 1:2. The mixed crystals are single-phase.

The products according to the invention, while having a fine particle size, exhibit substantially better fastness properties than similar known products and are therefore excellently suitable as tinctorially strong pigments. In addition, the part played by after-treatment is less critical.

Figure 1:
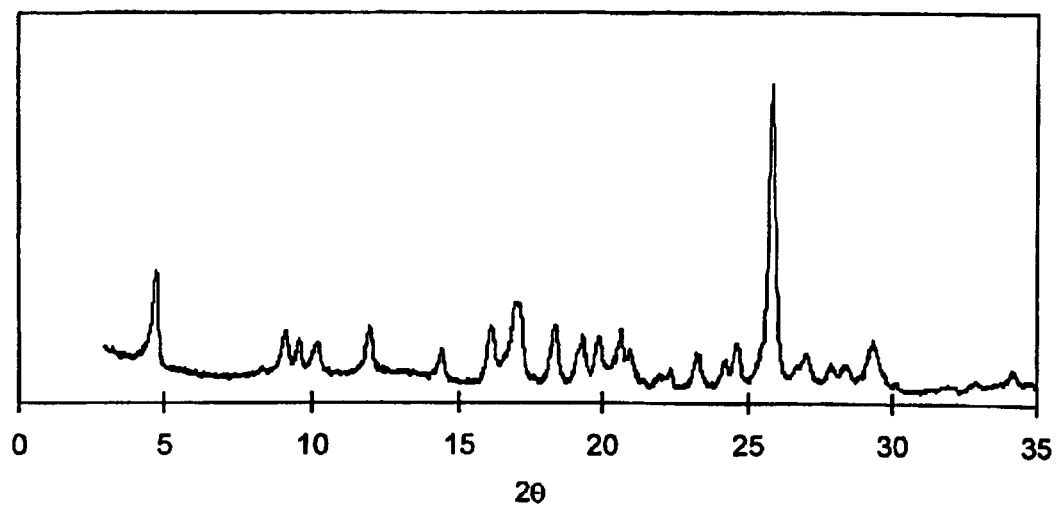
FIG. 1 is the x-ray powder pattern of the pigment of Example 1.

Example 18 of EP-B-0 241 413 discloses the pure ammonium salt of formula (I). The calcium salt did not become known until later, from EP-B-0 361 431, and is obtainable as Pigment Yellow 191. Like other yellow laked monoazo dyes, for example that of Example 3 of DE-OS-26 16 981 (Pigment Yellow 183), those of Examples 1 (Pigment Yellow 190) and 2 of EP-B-0 126 405 or that of Example 14 of EP-A-0 073 972, those products are known to exhibit satisfactory fastness properties only in a very tinctorially weak form (coarse particles having a customary length of approximately from 0.6 to 1.0 μm and width of approximately from 0.1 to 0.3 μm) (Industrielle Organische Pigmente, Chapter 2.3; VCH, Weinheim, 2nd edition 1995; ISBN 3-527-28744-2), which is a considerable disadvantage.

In addition, EP-A-0 073 972, EP-B-0 126 405, DE-OS-26 16 981 and EP-B-0 361 431 all disclose that alkaline earth metals and especially calcium are preferred for the Taking of monoazo dyes.

EP-A-0 263 074, on the other hand, describes mixed crystals of laked azo dyes, which crystals can be obtained by four different processes. According to Example 25, which is in tabular form, there is a mixed crystal that has been laked with a mixture of calcium ions and manganes ions, although the ratio of the cations is not indicated. Its colour shade, however, is an undesirable greenish-yellow. It has also been found that, contrary to expectations, the pigment is not obtained in pure mixed crystal form and is difficult to recrystallise.

Example 8 of EP-A-0 263 074 also lists, in tabular form, a mixed crystal that has been laked with a mixture of calcium ions and ammonium ions, the ratio of the cations again not being indicated. It has been found, however, that when that disulfonic acid is laked as indicated, analogously to the process of Example 7, by the simultaneous addition of calcium ions and twice as many ammonium ions, the resulting product is not a uniform mixed crystal but a product having a plurality of components: although the X-ray powder pattern is different from that of a physical mixture of the pure calcium and ammonium lakes, it is clear that a considerable amount of the pure calcium salt is present. Following after-treatment under conventional conditions, which is necessary in order to achieve competitive fastness properties, the pigment additionally exhibits low tinctorial strength.

WO-A-00/78872 discloses the need for metallized azo yellow pigments that show higher strength as well as good heat stability and good lightfastness. It is believed that the combination of Ethyl C Amine and 2B Acid is a unique combination to impart highest tinctorial strength.

Despite individual advantages, therefore, none of the known products is completely satisfactory in meeting the high demands made in respect of the compromise between tinctorial strength and fastness properties.

Surprisingly, pigments having greatly improved properties have now been obtained, in which pigments a disulfonic acid of formula (I) has been laked with alkaline earth metal cations and ammonium cations in a molar ratio of about 1:2. It should be noted that this figure relates not to the preparation process but to the pigments themselves. Even in the form of pigments having a fine or even a very fine particle size, for example needles having a length of from 0.1 to 0.6 μm and a width of from 0.02 to 0.2 μm, the products exhibit valuable slightly reddish-yellow colourations having outstanding fastness properties (especially heat resistance) with high tinctorial strength. The dimensions given are particle sizes averaged by weight, and it is of course possible for individual particles to lie outside the indicated range.

Accordingly, the invention relates to a pigment of formula:

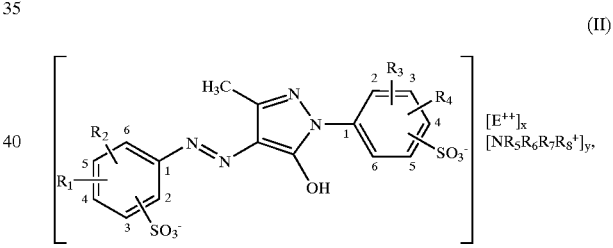

(II)

wherein $R_1$ is methyl or chlorine, $R_2$, $R_3$ and $R_4$ are each independently of the others hydrogen, methyl or chlorine, $R_5$, $R_6$, $R_7$ and $R_8$ are hydrogen or methyl, and E is Mg, Ca or Sr, wherein the pigment is a single-phase mixed crystal and x is a number from 0.33 to 0.62 and y is a number from 0.76 to 1.34.

The numbering of the carbon atoms in formula (II) is arbitrary and serves herein-below to indicate preferred substitution patterns at the two phenyl groups.

$R_1$ is preferably methyl. $R_2$ is preferably methyl or chlorine, especially chlorine. $R_3$ and $R_4$ are preferably identical and are especially both chlorine or both hydrogen, more especially both hydrogen. $R_5$, $R_6$, $R_7$ and $R_8$ are preferably hydrogen. E is preferably Ca. Very special preference is given to combinations of preferred substituents, especially $R_1$=methyl/$R_2$=chlorine/$R_3$=$R_4$=hydrogen, or combinations of preferred substituents E, $R_5$, $R_6$, $R_7$ and $R_8$, especially E=Ca/$R_6$=$R_7$=$R_8$=hydrogen.

Examples of $NR_5R_6R_7R_8^+$ are ammonium, methylammonium, dimethylammonium, trimethylammonium and tetramethylammonium, preferably ammonium or methylammonium, especially $NH_4^+$.

In the left-hand phenyl of formula (II), $SO_3^-$ is preferably bonded to $C^2$, $R_1$ is preferably bonded to $C^4$ and $R_2$ is preferably bonded to $C^5$. Examples are 4-chloro-2-sulfo-phenyl, 5-chloro-2-sulfo-phenyl, 4-methyl-2-sulfo-phenyl, 4,5-dichloro-2-sulfo-phenyl, 4,5-dimethyl-2-sulfo-phenyl, 4-chloro-2-sulfo-5-methyl-phenyl or 5-chloro-2-sulfo-4-methyl-phenyl.

In the right-hand phenyl of formula (II), $SO_3^-$ is preferably bonded to $C^3$ or $C^4$, $R_3$ is preferably bonded to $C^2$ and $R_4$ is preferably bonded to $C^4$ or $C^5$. $SO_3^-$ is bonded especially to $C^3$, $R_3$ is bonded especially to $C^2$ and $R_4$ is bonded especially to $C^5$.

Examples are 3-sulfo-phenyl, 4-sulfo-phenyl, 2-chloro-4-sulfo-phenyl, 2-chloro-5-sulfo-phenyl, 2-methyl-4-sulfo-phenyl, 2,4-dichloro-3-sulfo-phenyl, 2,5-dichloro-4-sulfo-phenyl, 3,4-dichloro-6-sulfo-phenyl or 2-chloro-4-sulfo-6-methyl-phenyl.

Very special preference is given to pigments of formula:

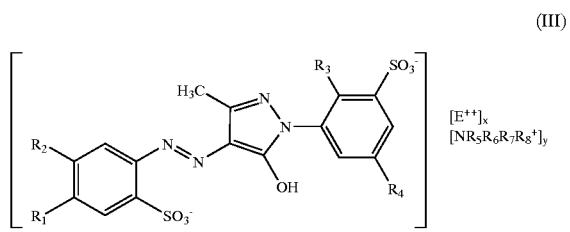

(III)

x is preferably a number from 0.40 to 0.59 and y is preferably a number from 0.82 to 1.20; x is especially a number from 0.47 to 0.53 and y is especially a number from 0.94 to 1.06. The sum of (2x+y) does not necessarily have to equal 2.00; on the contrary, it may be a little lower, for example 1.9, in which case, for example, protons or alkali metals are optionally present as additional cations, or alternatively it may be a little higher, for example 2.1, in which case, for example, a different calcium salt, such as calcium hydroxide, calcium carbonate or a calcium salt of an organic acid, for example calcium stearate or calcium behenate, may optionally additionally be present. If (2x+y) differs from 2.00, the difference is advantageously to be within narrow limits in order not to destroy the homogeneous crystal phase. The sum of (2x+y) is preferably from 1.95 to 2.05, especially from 1.97 to 2.03, more especially from 1.98 to 2.00, most especially 2.00.

The homogeneity of the crystal phase in the mixed crystal can be determined by means of an X-ray powder pattern. As is shown by the figures mentioned above, the pure, single-phase mixed phase exists only within particular concentration limits. The crystalline modification of the mixed phase appears to be susceptible to being adversely affected by the presence of other components (for example seed crystals consisting of a pure alkaline earth metal salt or a pure ammonium salt of a disulfonic acid of formula (I)). It is supposed that each alkaline earth metal cation or ammonium cation has a fixed position in the perfect mixed phase, which could only be ascertained by X-ray analysis of a single crystal. Although alkaline earth metal cations or ammonium cations in excess are, surprisingly, incorporated, possibly in the form of a solid solution, that is possible only within relatively narrow limits, otherwise, instead of a homogeneous mixed phase being formed, there is formed a plurality of phases side by side, which leads to the loss of the excellent properties of the single-phase mixed phases according to the invention.

The pigment particles preferably have a length of from 0.1 to 0.6 $\mu$m and a width of from 0.02 to 0.2 $\mu$m, especially a length of from 0.3 to 0.5 $\mu$m and a width of from 0.05 to 0.15 $\mu$m.

The pigments according to the invention are distinguished especially by high fastness to migration, water and to solvents, stability to light, weathering and to heat, good rheology and ready dispersibility, those advantageous properties being achievable, wholly unexpectedly and in contrast to products known hitherto, also with high tinctorial strength. The colour saturation (chroma C*) is also astonishingly high.

It is in agreement with the comments above that the pigments in the pure mixed phase crystal lattice according to the invention cannot be prepared by an arbitrary method. On the contrary, the simultaneous addition of the two cations in the desired ratio results not, as would be assumed on the basis of Example 8 of EP-A-0 263 074, in the pigments according to the invention but in a mixture comprising the calcium salt. It is therefore necessary according to the invention to prevent the formation of crystals of the pure ammonium or alkaline earth metal salts of the disulfonic acids of formula (I).

Contrary to logic, it has now been found, extremely surprisingly, that the pigments according to the invention are obtained if the crystallisation of the laking products begins in the presence of an excess of solvated alkaline earth metal ions, based in molar terms on the solvated ammonium ions.

Accordingly, the invention relates also to a process for the preparation of a pigment of formula:

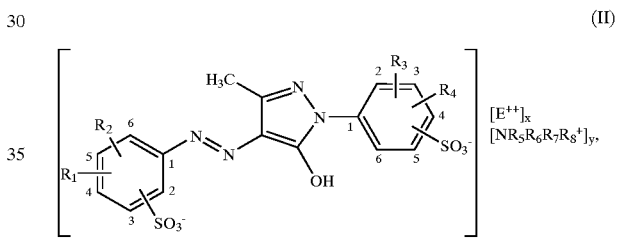

(II)

wherein $R_1$ is methyl or chlorine, $R_2$, $R_3$ and $R_4$ are each independently of the others hydrogen, methyl or chlorine, $R_5$, $R_6$, $R_7$ and $R_8$ are hydrogen or methyl, and E is Mg, Ca or Sr, by crystallisation from an inert hydrophilic liquid in the presence of solvated cations $E^{++}$ and $NR_5R_6R_7R_8^+$, in which process the pigment is a single-phase mixed crystal and x is a number from 0.33 to 0.62 and y is a number from 0.76 to 1.34, and the concentration of solvated cations $E^{++}$ at the beginning of the crystallisation is higher than the concentration of solvated cations $NR_5R_6R_7R_8^+$.

Inert hydrophilic liquids are, for example, water or slightly polar organic solvents, for example those having a dipole moment $\mu$ of approximately from 1.5 to $3.0 \cdot 10^{-18}$ esu (from 1.5 to 3.0 Debye, measured in benzene at 25° C.), preferably from 1.8 to $2.8 \cdot 10^{-18}$ esu, as well as any desired mixtures containing water or slightly polar organic solvents. Preference is given to water and aqueous mixtures, especially water. Hydrophilic slightly polar organic solvents are, for example, $C_1$–$C_4$alcohols or glycols, polyglycols and ketones. Solvated cations are to be understood as being cations that are in the liquid phase, but not in solid particles suspended therein.

The molar amount of solvated cations $E^{++}$ at the beginning of crystallisation of the pigment is advantageously at least 125%, preferably at least 150%, especially from twice to one hundred times the molar amount of solvated cations $NR_5R_6R_7R_8^+$.

The process can be carried out, for example, by diazotisation of 1 mol of an amino-sulfonic acid of formula:

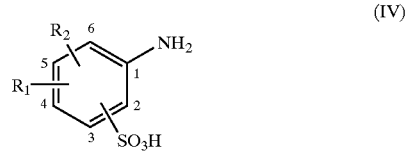
(IV)

in the presence of 1 mol of a sulfonic acid of formula:

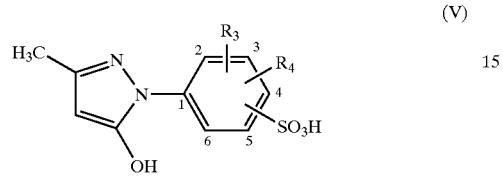
(V)

{=coupling component} initially in the presence of from 0.4 to 0.8 mol of an alkaline earth metal salt at a pH value of from 0 to 3, for example in the presence of an alkaline earth metal halide, such as $MgCl_2.6H_2O$, $CaCl_2.6H_2O$ or $SrCl_2$. Then, without waiting for crystallisation of the pigment to begin or even bringing crystallisation about by raising the temperature to above 50° C., from 0.76 to 1.34 mol of $NR_5R_6R_7$ are added. The diazotisation preferably takes place at a pH value of from 1 to 2; crystallisation of the pigment according to the invention begins as soon as the amine is added, specially when it is ammonia.

It is even simpler initially to carry out the diazo coupling to the disulfonic acid in the presence of y mol of $NR_5R_6R_7R_8^+$ and first to wait for colloidal precipitation of the ammonium salt. x mol of an alkaline earth metal salt are then added, whereupon the colloidal precipitate dissolves steadily and the desired product according to the invention is formed at the same time. After-treatment is then preferably carried out.

A third method consists in together recrystallising a sulfonate salt of formula (II) wherein x is 1 and y is 0 and a sulfonate salt of formula (II) wherein x is 0 and y is 2 in the molar ratio of x:y according to the invention, each in as fine, amorphous a form as possible, a portion of the sulfonate salt of formula (II) wherein x is 0 and y is 2 advantageously being added initially and the remainder being metered in in portions or continuously only during the recrystallisation. It must be ensured that both sulfonate salts of formula (II) are present in substantially amorphous form, since the formation of the desired pigments is otherwise all too readily unsuccessful for thermodynamic and/or kinetic reasons and a mixture or agglomerate of a plurality of crystal phases according to the previous prior art is formed instead. In addition, it must also be ensured that alkaline earth metal ions are solvated in a sufficient amount according to the invention. It is therefore recommended in the synthesis, following conventional diazotisation and coupling, for example at from 10 to 22° C. in an acetic acid or, preferably, a hydrochloric acid medium (pH value from 4 to 6) and subsequent laking of the sulfonate salts in each case with an alkaline earth metal salt or ammonia, to dispense with recrystallisation as far as filterability will permit, and then to use the product as soon as possible in the form of moist filter cakes as described above.

The pigments according to the invention exhibit outstanding crystallinity. Nevertheless, they may optionally be subjected to additional after-treatment in order further to optimise their properties. That step may be carried out according to processes known per se, for example by heating in water, a slightly polar hydrophilic organic solvent or a mixture thereof, to a temperature of approximately from 50 to 200° C. (optionally under pressure) for a period that may be from a few minutes up to 100 hours depending on the recrystallising medium and the temperature. Preference is given to after-treatment in water for from 0.5 to 6 hours at from 50 to 99° C., especially for from 1 to 4 hours at from 65 to 85° C. The after-treatment is advantageously carried out directly after the laking, optionally without intermediate isolation.

If desired, a crystallisation inhibitor likewise known per se, for example a sulfonic acid of formula:

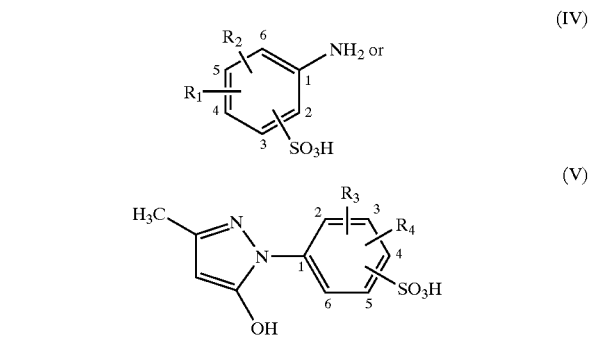

can be added in conventional amounts before or during the after-treatment. Conventional amounts are, for example, from 0.01 to 0.03 mol, based on 1 mol of pigment.

The pigments according to the invention can be isolated in pure form and dried, following which they are readily dispersible in plastics, surface coatings and printing inks, for example by means of a ball mill or a bead mill. They can also be used in the form of moist filter cakes directly for the preparation of pigment dispersions. Conventional additives in conventional concentrations may optionally be added to the pigments according to the invention before or during the precipitation or isolation in order to improve the application-related properties.

As well as for the mass-pigmenting of high molecular weight organic materials in the form of plastics, surface coatings and printing inks, they are also suitable, for example, for the production of solid toners, wax transfer ribbons or colour filters.

The high molecular weight organic material to be coloured according to the invention may be of natural or synthetic origin and usually has a molecular weight in the range from $10^3$ to $10^8$ g/mol. It may be, for example, a natural resin or drying oil, rubber or casein, or a modified natural material such as chlorinated rubber, an oil-modified alkyd resin, viscose, a cellulose ether or ester, such as cellulose acetate, cellulose propionate, cellulose acetobutyrate or nitrocellulose, but especially a totally synthetic organic polymer (both thermosetting plastics and thermoplastics), as can be obtained by polymerisation, polycondensation or polyaddition, for example a polyolefin, such as polyethylene, polypropylene or polyisobutylene, a substituted polyolefin, such as a polymerisation product of vinyl chloride, vinyl acetate, styrene, acrylonitrile, an acrylic acid and/or methacrylic acid ester or butadiene, as well as a copolymer of the mentioned monomers, especially ABS or EVA.

From the series of the polyaddition resins and polycondensation resins there may be mentioned the condensation products of formaldehyde with phenols, so-called phenoplasts, and the condensation products of formaldehyde with urea, thiourea and melamine, so-called aminoplasts, the polyesters used as surface-coating resins, either saturated, such as alkyd resins, or unsaturated, such as maleic resins, and also linear polyesters and polyamides or silicones.

The mentioned high molecular weight compounds may be in the form of single compounds or mixtures, in the form of plastic masses or melts, which may optionally be spun to form fibres.

They may also be in the form of their monomers or in the polymerised state in dissolved form as film formers or binders for surface coatings or printing inks, such as boiled linseed oil, nitrocellulose, alkyd resins, melamine resins, urea-formaldehyde resins or acrylic resins.

Pigmentation of the high molecular weight organic substances with the pigments according to the invention is carried out, for example, by admixing such a pigment, optionally in the form of a masterbatch, with the substrates using rolling mills, mixing or grinding apparatus. The pigmented material is then generally brought into the desired final form by methods known per se, such as calendering, compression moulding, extrusion, coating, casting or by injection moulding. In order to produce non-rigid mouldings or to reduce their brittleness, it is often desirable to incorporate so-called plasticisers into the high molecular weight compounds prior to shaping. There may be used as plasticisers, for example, esters of phosphoric acid, phthalic acid or sebacic acid. In the process according to the invention, the plasticisers may be incorporated before or after the incorporation of the pigment dye into the polymers. It is also possible, in order to achieve different hues, to add to the high molecular weight organic materials, in addition to the pigment compositions, also fillers or other colour-providing constituents, such as white, coloured or black pigments as well as effect pigments, in each case in the desired amount.

For the pigmenting of surface coatings and printing inks, the high molecular weight organic materials and the pigments according to the invention are finely dispersed or dissolved, optionally together with additives such as fillers, other pigments, siccatives or plasticisers, generally in an organic and/or aqueous solvent or solvent mixture. It is also possible to use a procedure in which the individual components are dispersed or dissolved separately or in which a plurality are dispersed or dissolved together and only then all of the components combined.

Accordingly, a further embodiment relates also to mass-coloured high molecular weight organic material, comprising
(a) from 0.05 to 70% by weight, based on the sum of (a) and (b), of a pigment according to the invention, and
(b) from 99.95 to 30% by weight, based on the sum of (a) and (b), of a high molecular weight organic material.

The material in question may be either a ready-for-use composition or an article formed therefrom, or a masterbatch, for example in the form of granules. The high molecular weight organic material coloured according to the invention may also comprise conventional additives, for example stabilisers.

Accordingly, a further embodiment relates also to a method of mass-colouring high molecular weight organic material, which method comprises incorporating into the material a pigment according to the invention, for example by mixing and processing the high molecular weight organic material together with the pigment composition according to the invention, optionally in the form of a masterbatch, in a manner known per se.

The Examples which follow illustrate the invention without limiting the scope thereof (unless indicated to the contrary, "%" is always % by weight):

EXAMPLE 1A 12.9 g of 2-amino-4-chloro-5-methyl-benzene-1-sulfonic acid are dispersed in 150 ml of water. After cooling to 20° C., 5.6 ml of 37% hydrochloric acid and 14.6 ml of a 4M $NaNO_2$ solution are added. After stirring for a further 15 minutes, a solution of 18.2 g of 84.6% 1-(3'-sulfophenyl)-3-methyl-5-pyrazolone in 50 ml of water is added, followed by the metered addition of 4.2 g of $CaCl_2.2H_2O$ in 40 ml of water. The pH value is then adjusted to 6.8 using a 15% ammonia solution. The resulting suspension is heated for 30 minutes at 23° C., and then heated to 75° C. and stirred for a further one hour. The pigment is then filtered off, washed, dried at 150° C./100 mbar and powdered. There is obtained a yellow pigment of high tinctorial strength, the X-ray powder pattern of which is shown in FIG. 1 (X-ray powder pattern with Bragg angles ($2\theta/CuK_\alpha$) of 4.8, 9.1, 9.6, 10.1, 11.9, 14.4, 16.1, 17.1, 18.4, 19.3, 19.9, 20.6, 23.3, 24.6, 25.8, 27.0 and 29.3; the accuracy is approximately ±0.15). The heat stability in polyolefin is even slightly better, as compared with a pure calcium lake (Pigment Yellow 191), the tinctorial strength of which is more than 40% lower.

EXAMPLE 1B 51.6 kg of 2-amino-4-chloro-5-methyl-benzene-1-sulfonic acid are dispersed in 600 liters of water. After cooling to 15° C., 26 liters of 32% hydrochloric acid and, in the course of one hour, 58.4 liters of a 4M $NaNO_2$ solution are added. After stirring for a further 15 minutes, a solution of 72.8 kg of 84.6% 1-(3'-sulfo-phenyl)-3-methyl-5-pyrazolone in 200 liters of water is introduced, followed by 16.8 kg of $CaCl_2.2H_2O$ in 160 liters of water. A 15% ammonia solution is then introduced until the pH value is 6.8. The resulting suspension is heated for 30 minutes at 23° C., and then heated to 75° C. in the course of 2 hours and stirred for a further half an hour; the suspension is then isolated using a filter centrifuge and dried. The moist material is re-dispersed in water and dried in a spray tower. A tinctorially strong yellow pigment having properties similar to Example 1A is obtained.

EXAMPLE 2

12.9 g of 2-amino-4-chloro-5-methyl-benzene-1-sulfonic acid are dispersed in 150 ml of water. After cooling to 10° C., 5.6 ml of 37% hydrochloric acid and 14.6 ml of a 4M $NaNO_2$ solution are added. After stirring for a further 15 minutes, a solution of 18.2 g of 84.6% 1-(3'-sulfophenyl)-3-methyl-5-pyrazolone in 50 ml of water is added. The pH value is then adjusted to 6.8 using a 15% ammonia solution. The resulting suspension is stirred for 30 minutes at 23° C. to complete the reaction; 6.0 g of $CaCl_2.2H_2O$ are then added, and stirring is carried out for a further one hour at 75° C. The pigment is then filtered off, washed, dried at 150° C./100 mbar and powdered. A tinctorially strong yellow pigment having properties similar to Example 1A is obtained.

EXAMPLE 3

12.9 g of 2-amino-4-chloro-5-methyl-benzene-1-sulfonic acid are dispersed in 150 ml of water. After cooling to 20° C., 5.6 ml of 37% hydrochloric acid and 14.6 ml of a 4M $NaNO_2$ solution are added. After stirring for a further 15 minutes, a solution of 18.2 g of 84.6% 1-(3'-sulfophenyl)-3-methyl-5-pyrazolone in 50 ml of water is added. The pH value is then adjusted to 6.8 using a 15% ammonia solution. After stirring the resulting suspension for 30 minutes at 23° C. to complete the reaction, 98.1 ml of a 3% solution of Staybelite Resin™ (hydrogenated colophony, C.A. registry number 39387-73-0) in 0.1 M NaOH are added. 6.0 g of $CaCl_2.2H_2O$ in 50 ml of water are then metered in. The suspension is then stirred for a further one hour at 75° C. and the pigment is isolated as in the preceding Examples. A tinctorially strong yellow pigment having properties similar to Example 1A is obtained.

EXAMPLE 4

The procedure is analogous to Example 1A, but 2-amino-4-methyl-5-chloro-benzene-1-sulfonic acid is used instead of 2-amino4-chloro-5-methyl-benzene-1-sulfonic acid.

EXAMPLE 5

The procedure is analogous to Example 1A, but 2-amino-4,5-dichloro-benzene-1-sulfonic acid is used instead of 2-amino-4-chloro-5-methyl-benzene-1-sulfonic acid.

EXAMPLE 6

The procedure is analogous to Example 1A, but 2-amino-4,5-dichloro-benzene-1-sulfonic acid is used instead of 2-amino-4-chloro-5-methyl-benzene-1-sulfonic acid and 1-(4'-sulfo-2,5-dichloro-phenyl)-3-methyl-5-pyrazolone is used instead of 1-(3'-sulfophenyl)-3-methyl-5-pyrazolone.

EXAMPLE 7

12.2 g of 2,4-dichloro-5-methyl-benzene-1-sulfonic acid are dispersed in 150 ml of water. After cooling to 20° C., 5.6 ml of 37% hydrochloric acid and 14.6 ml of a 4M $NaNO_2$ solution are added. After stirring for a further 15 minutes, a solution of 18.2 g of 84.6% 1-(3'-sulfophenyl)-3-methyl-5-pyrazolone in 50 ml of water is added, followed by the metered addition of 4.2 g of $CaCl_{20}.2H_2O$ in 40 ml of water. The pH value is then adjusted to 6.8 using 15% ammonia solution. The resulting suspension is heated for 30 minutes at 23° C., and then heated to 75° C. and stirred for a further one hour. The pigment is then filtered off, washed, dried at 150° C./100 mbar and powdered. There is obtained a yellow pigment having a molar ratio $Ca^{++}:NH_4^+$ of 29:71, which pigment, when incorporated into a standard PVC formulation, proves to have very high tinctorial strength ($L^*=91.6/C^*=48.8/h=8.16$).

COMPARISON EXAMPLE 1

The product according to Example 25 of EP-A-0 263 074 is prepared by the method disclosed in Example 7 of EP-A-0 263 074. After-treatment corresponds to that of Example 1A according to the invention. The product has very poor crystallinity and is very greenish.

COMPARISON EXAMPLE 2

The procedure is analogous to Example 1A and the same amounts of the same starting materials are used, the only difference being that laking with calcium ions and ammonium ions is carried out not sequentially but simultaneously analogously to Examples 7 and 8 of EP-A-0 263 074. Although the X-ray powder pattern of the resulting product, as disclosed in EP-A-0 263 074, is different from that of a physical mixture of the pure calcium and ammonium lakes, a considerable amount of the pur calcium salt is present. The molar ratio $Ca^{++}:NH_4^+$ is 47:53 (corresponding to approximately 0.64 calcium and 0.73 ammonium per pigment molecule). The product is more greenish and has a substantially lower colour saturation (hue difference $\Delta h=3.3$/chroma difference $\Delta C^*=4.8$) than the product of Example 1A.

COMPARISON EXAMPLE 3

The procedure of Example 8 of EP-A-0 263 074 is followed, yielding a green-tinged yellow pigment having a molar ratio $Ca^{++}:NH_4^+$ of 50:50, which pigment, when incorporated into the same PVC formulation, exhibits 24% less tinctorial strength and 10% less saturation than the product according to Example 7.

COMPARISON EXAMPLE 4

The procedure is analogous to Example 8 of EP-A-0 263 074 but, instead of ammonium ions, twice the amount of calcium acetate is used. There is obtained a greenish, pure calcium pigment which, when incorporated into the same PVC formulation, exhibits 34% less tinctorial strength and 13% less saturation than the product according to Example 7.

EXAMPLE 8

The X-ray powder pattern of the product according to Example 7 is compared with those of the products according to Comparison Examples 3 and 4:

| Product according to: | Crystal phase assignment: |
| --- | --- |
| Comparison Example 4 | α |
| Example 7 | β |
| Comparison Example 4 | α + additional signals |

What is claimed is:
1. A pigment of formula:

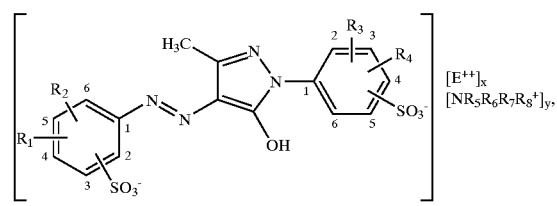

(II)

wherein $R_1$ is methyl or chlorine, $R_2$, $R_3$ and $R_4$ are each independently of the others hydrogen, methyl or chlorine, $R_5$, $R_6$, $R_7$ and $R_8$ are hydrogen or methyl, and E is Mg, Ca or Sr, wherein the pigment is a single-phase mixed crystal and x is a number from 0.33 to 0.62 and y is a number from 0.76 to 1.34.

2. A pigment according to claim 1 of formula:

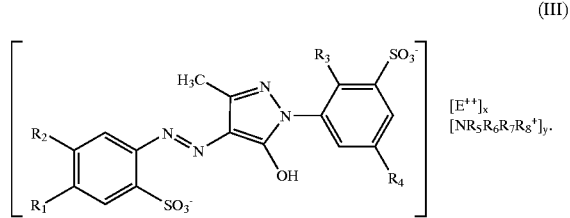

(III)

3. A pigment according to claim 1, wherein $R_2$ is methyl or chlorine, $R_3$ and $R_4$ are both chlorine or both hydrogen, $R_5$, $R_6$, $R_7$ and $R_8$ are hydrogen and E is Ca.

4. A pigment according to claim 3, wherein $R_2$ is chlorine.

5. A pigment according to claim 4, wherein $R_3$ and $R_4$ are hydrogen.

6. A pigment according to claim 5, having an X-ray powder powder having Bragg angles (2θ/CuK$_α$) of 4.8, 9.1, 9.6, 10.1, 11.9, 14.4, 16.1, 17.1, 18.4, 19.3, 19.9, 20.6, 23.3, 24.6, 25.8, 27.0 and 29.3.

7. A pigment according to claim 1, wherein x is from 0.40 to 0.59 and y is from 0.82 to 1.20.

8. A pigment according to claim 7, wherein x is from 0.47 to 0.53 and y from 0.94 to 1.06.

9. A pigment according to claim 1 having a weight average particle length of from 0.1 to 0.6 μm and a weight average particle width of from 0.02 to 0.2 μm.

10. A pigment according to claim 9 having a weight average particle length of from 0.3 to 0.5 μm and a weight average particle width of from 0.05 to 0.15 μm.

11. A mass-coloured high molecular weight organic material, comprising
    (a) from 0.05 to 70% by weight, based on the sum of (a) and (b), of a pigment according to claim 1, and
    (b) from 99.95 to 30% by weight, based on the sum of (a) and (b), of a high molecular weight organic material.

12. A mass colored high molecular weight organic material according to claim 11, which material is a solid toner, wax transfer ribbon or color filter.

13. A method of mass-colouring high molecular weight organic material, which method comprises incorporating into the material a pigment according to claim 1.

14. A process for the preparation of a pigment of formula:

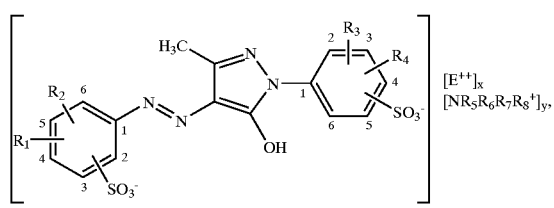

(II)

wherein $R_1$ is methyl or chlorine, $R_2$, $R_3$ and $R_4$ are each independently of the others hydrogen, methyl or chlorine, $R_5$, $R_6$, $R_7$ and $R_8$ are hydrogen or methyl, and E is Mg, Ca or Sr, and wherein the pigment is a single-phase mixed crystal, x is a number from 0.33 to 0.62 and y is a number from 0.76 to 1.34, comprising the steps of:

inducing crystallization of a dissolved, colloidal or substantially amorohous compound or mixture of compounds selected from the group consisting of compounds of formula

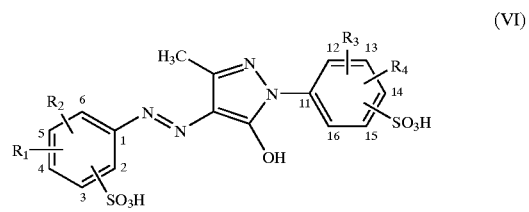

(VI)

and alkaline earth metal and ammonium salts thereof, from an inert hydrophilic liquid in the presence of solvated cations $E^{++}$ and $NR_5R_6R_7R_8^+$, at a concentration of solvated cations $E^{++}$ higher than the concentration of solvated cations $NR_5R_6R_7R_8^+$, then adding further cations $E^{++}$ and/or $NR_5R_6R_7R_8^+$ to obtain the pigment of formula (II).

15. A process according to claim 14, wherein the pigment is after-treated with water, a slightly polar organic solvent or a mixture thereof, for from 0.5 to 6 hours at from 50 to 99° C.

16. A process according to claim 14 comprising the steps of:

diazotising 1 mol of an aminosulfonic acid of formula

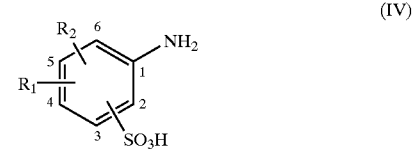

(IV)

in the presence of 1 mol of a sulfonic acid of formula

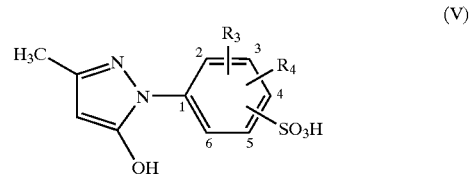

(V)

and from 0.4 to 0.8 mol of an alkaline earth metal salt at a pH value of from 0 to 3, and adding from 0.76 to 1.34 mol of $NR_5R_6R_7$, wherein $R_5R_6R_7$ are hydrogen or methyl, without waiting for crystallisation of the pigment to begin.

17. A process according to claim 16, wherein the diazotizing step takes place at a pH value of from 1 to 2 and $NR_5R_6R_7$ is ammonia.

18. A process according to claim 14, wherein the diazotizing step is carried out in the presence of y mol of $NR_5R_6R_7R_8^+$ and, adding x mol of an alkaline earth metal salt after colloidal precipitation of the ammonium salt.

19. A process according to claim 14, comprising the steps of:

placing a suspension of a sulfonate salt of formula:

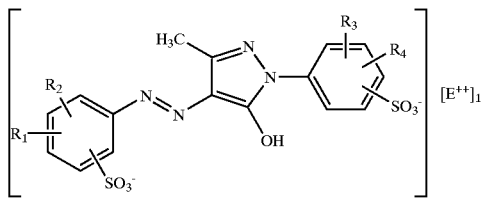
(IIa)

in a vessel;

adding in a molar ratio greater than x:y a sulfonate salt of formula (IIb):

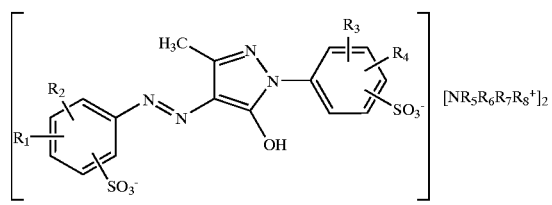
(IIb)

then metering more sulfonate salt of formula (IIb) in at a recrystallisation temperature of from 50 to 200° C. until the molar ratio reaches x:y, the sulfonate salts of formula (IIa) and (IIb) each being used in substantially amorphous form as moist filter cakes.

20. A process according to claim 14, wherein after-treatment with water, a slightly polar organic solvent, or a mixture thereof, is carried out for from 0.5 to 6 hours at from 50 to 99° C.

21. A process according to claim 20, wherein a sulfonic acid of formula:

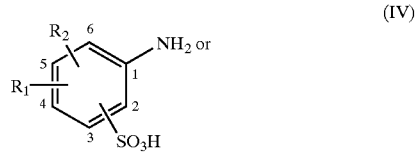
(IV)

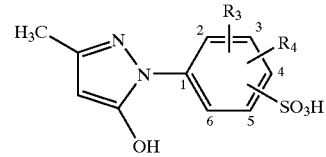
(V)

is added before or during the after-treatment.

* * * * *